(12) United States Patent
Borland et al.

(10) Patent No.: US 6,218,952 B1
(45) Date of Patent: Apr. 17, 2001

(54) TRAILER LIGHT MONITOR

(76) Inventors: Leslie R. Borland, Six Signal Hill Rd., Lake Placid, NY (US) 12946; Theodore Richard Haller, 16 Sunny Side Rd., Scotia, NY (US) 12302

(*) Notice: Subject to any disclaimer, the term of this patent is extended or adjusted under 35 U.S.C. 154(b) by 0 days.

(21) Appl. No.: 09/292,083

(22) Filed: Apr. 14, 1999

Related U.S. Application Data

(63) Continuation-in-part of application No. 09/164,430, filed on Sep. 30, 1998.

(51) Int. Cl.[7] .................................................. G08B 21/00
(52) U.S. Cl. ............................................................ 340/641
(58) Field of Search .................................. 340/641, 642, 340/664, 431, 458; 324/504

(56) References Cited

U.S. PATENT DOCUMENTS

| | | | |
|---|---|---|---|
| 5,635,843 | 6/1997 | Borland | 324/504 |
| 5,739,592 * | 4/1998 | Rigsby et al. | 307/9.1 |
| 5,936,407 * | 8/1999 | Borland | 324/504 |
| 5,990,788 * | 11/1999 | Syracuse | 340/641 |

FOREIGN PATENT DOCUMENTS

| 1558565 | 1/1980 | (GB) | G01R/31/00 |
|---|---|---|---|

OTHER PUBLICATIONS

National Semiconductor LM1946 Over/Under Current Limit Diagnostic Circuit; 12 pp.

* cited by examiner

Primary Examiner—Glen Swann
(74) Attorney, Agent, or Firm—Randall L. Reed; Levin & Hawes LLP

(57) ABSTRACT

A system which monitors the functioning of safety and signal light circuits on a trailer and verify the lights are operating properly. The system connects into the signal and safety light circuits of the trailer and includes a unit which can be positioned within view of an operator of the vehicle towing the trailer. The unit has an appropriate visual display which warns the operator if one of the safety or signal light circuits have ailed. The visual display can be light emitting diodes which provide an appropriate visual signal. The unit can also include an audio signaling device to warn of a failure in the signal and safety light circuit.

27 Claims, 5 Drawing Sheets

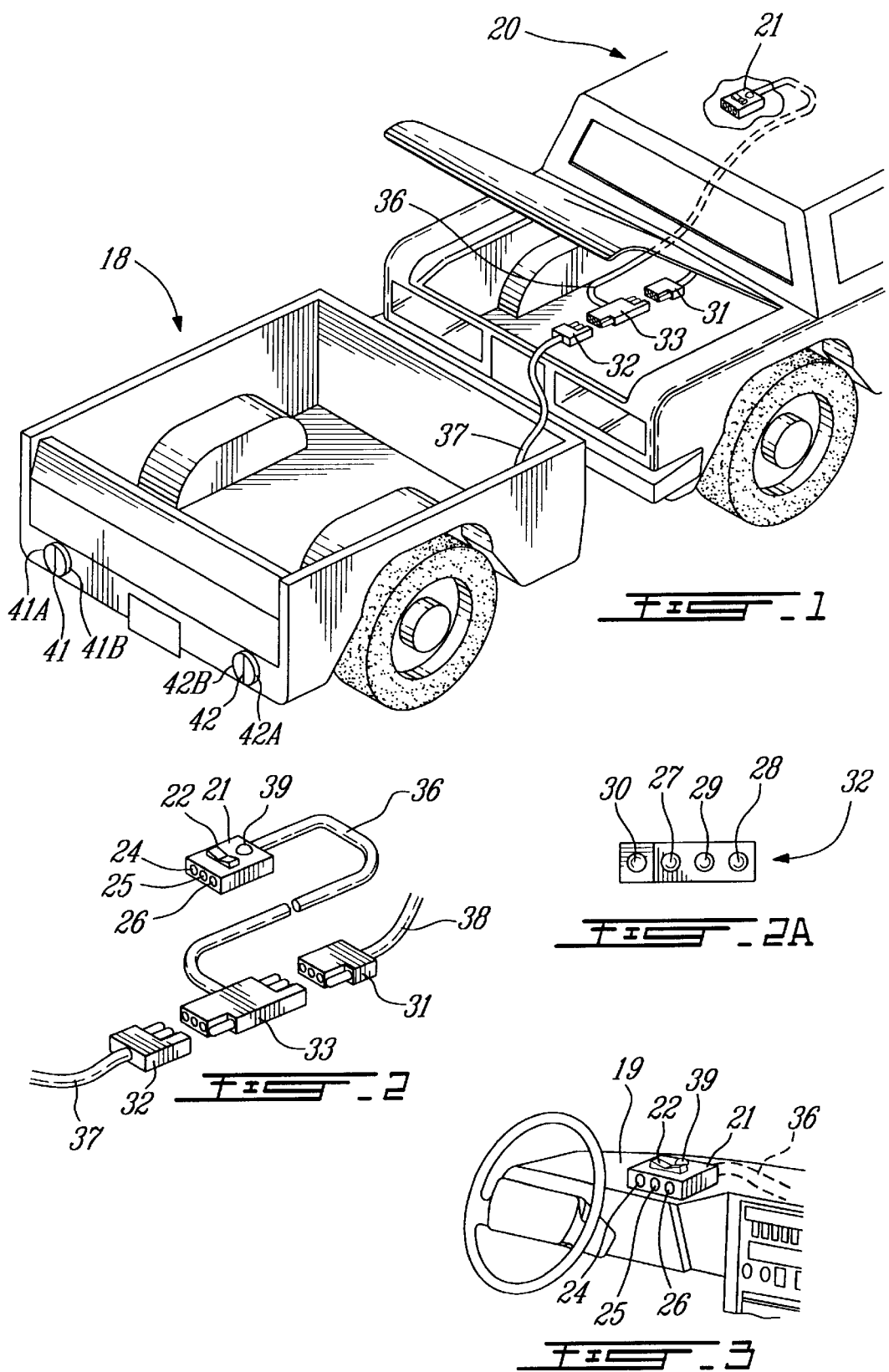

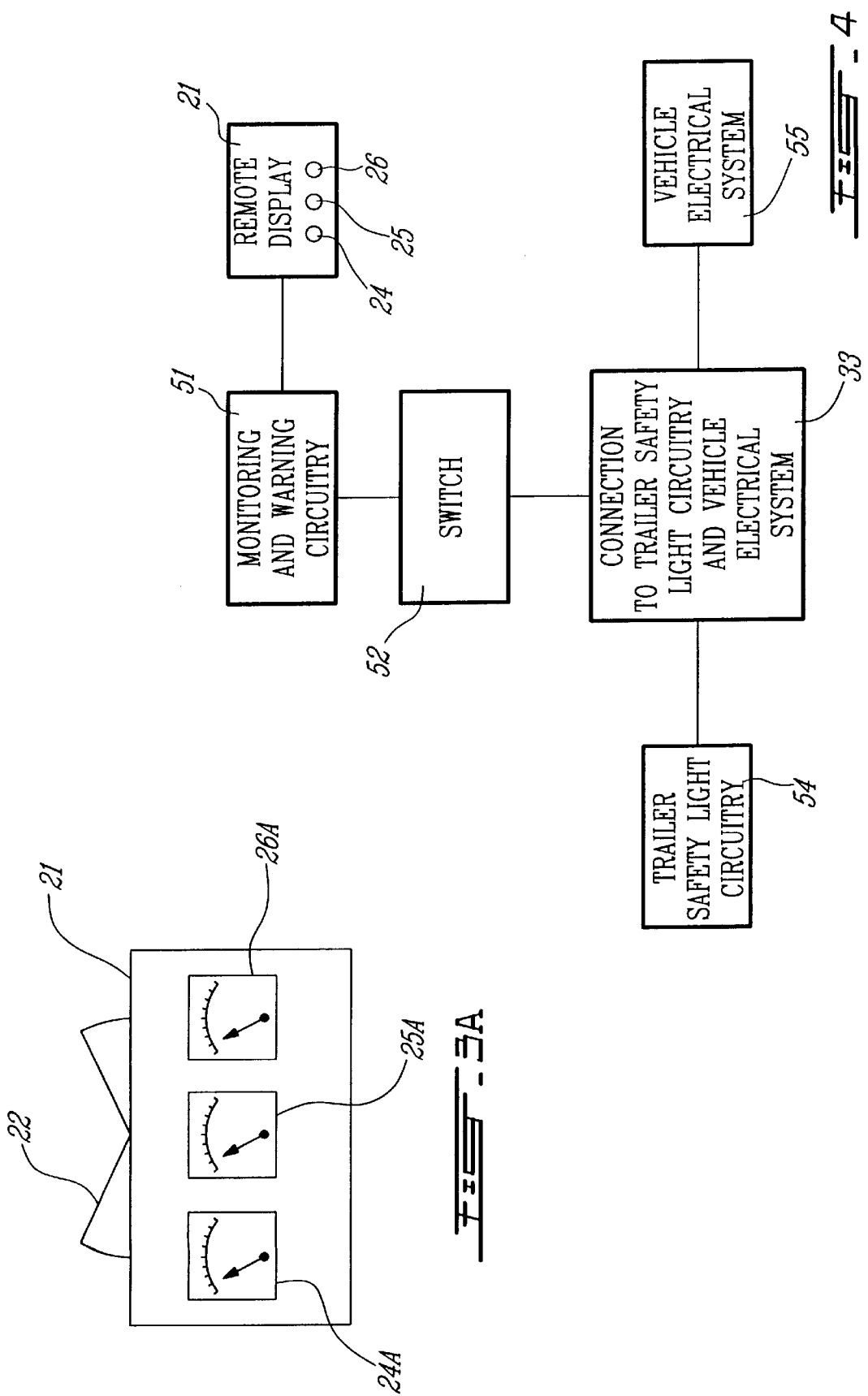

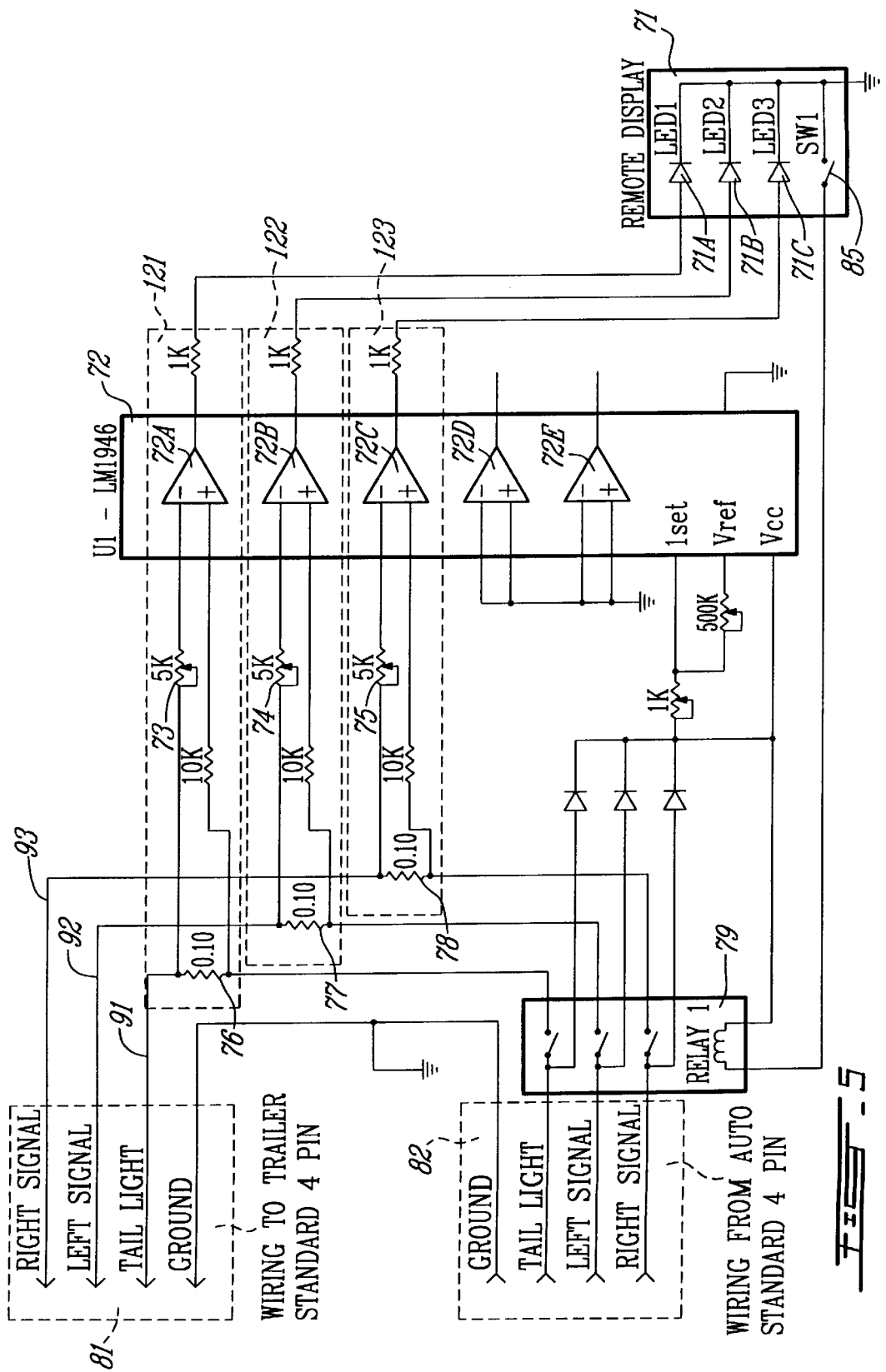

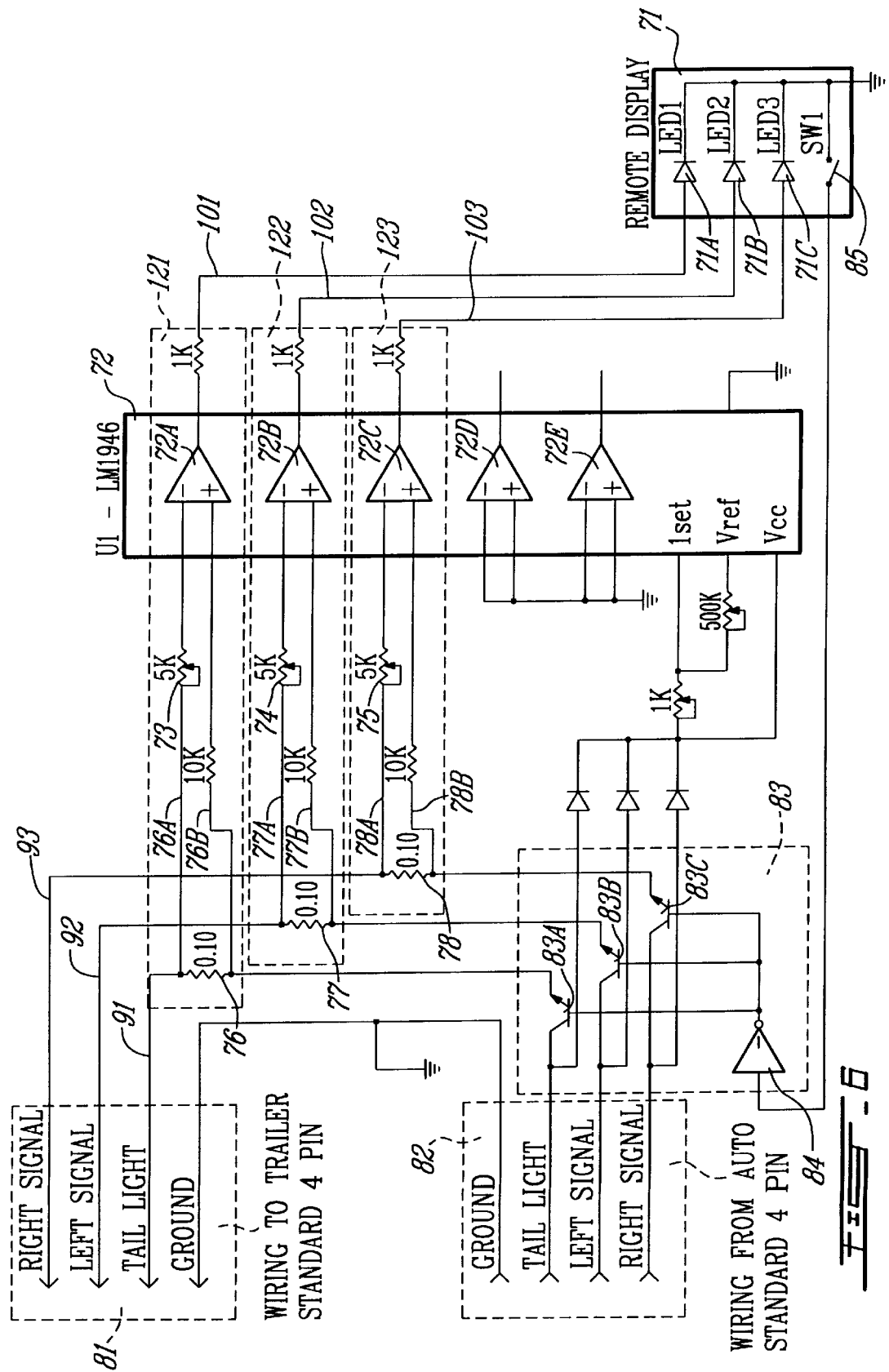

TRAILER LIGHT MONITOR

CROSS-REFERENCE TO A RELATED APPLICATION

This is a continuation in part of prior application Ser. No. 09/164,430 filed Sep. 30, 1998.

FIELD OF THE INVENTION

The present invention relates to systems for monitoring the safety lighting circuits on a trailer. More particularly it relates to a system and apparatus for monitoring the safety lighting circuits on a trailer while the trailer is being towed.

BACKGROUND OF THE INVENTION

Trailers pulled by vehicles such as cars, trucks, sports utility or similar vehicles are extremely common. The trailers vary from open trailers for hauling loads to boat trailers and campers. One important requirement, for safety and legal reasons, is that the trailer have appropriate safety lights such as turn signals, brake lights, and running and parking lights. These lights naturally have to be controlled from the vehicle pulling the trailer so the driver can signal those behind the trailer of turns or braking actions before they occur or simply warn vehicles approaching the trailer from behind at night of the presence of the trailer being towed on the road. The trailer safety light circuits usually connect directly into the electrical system of the towing vehicle by standard connectors and wiring methods. The trailer safety light circuits generally work in tandem with the safety light circuits on the towing vehicle. However, the safety lighting circuitry of trailers have a notorious reputation for unreliability and failure. The inability of the vehicle operator to easily check to determine if the circuitry is operating properly only compounds this problem.

Failure of the safety lighting circuits on a trailer can create extremely hazardous situations and the fact that the trailer being towed by the vehicle partially obstructs the 'view' of the operator further compounds the problem. In order to verify the proper functioning of all of the safety lighting circuits the vehicle operator needs the assistance of a second party to stand behind the trailer to observe the operation of the safety lighting circuitry while the vehicle operator tests them. In addition to being an awkward method of verifying proper operation of the safety lighting circuitry it does not provide any suitable means to verify the proper functioning of the safety lighting circuitry during actual operation of the vehicle while towing the trailer. Additionally, the vehicle operator can not easily or conveniently test the safety lighting circuitry if he has no one present to assist in the process.

Boat trailers present their own unique problems as a result of their being periodically submerged during the launching and retrieving of the boat which the trailer carries. The safety lighting circuits as a result of the periodic dunking have a tendency to corrode much more easily. Also, the circuit bulbs burn out much more frequently from being immersed in water, during the time they are 'on' or activated, due to the vehicle operators inability to easily turn the circuits off.

To further compound the problem, trailers tend to have a low maintenance priority and are often left outside exposed to the elements between use which in many instances can be infrequent

SUMMARY

It is an object of the present invention to provide an apparatus and system to allow a vehicle operator to quickly, test without the need for assistance from another, the safety lighting circuitry of a trailer when that trailer is connected to the vehicle with which the trailer will be towed.

It is a further object of the present invention to provide an apparatus, system and method for the operator of a vehicle pulling a trailer to be able to periodically monitor the function of the trailer's safety light signal circuits and be able to determine when a failure occurs in those circuits.

It is yet another object of the present invention to provide a system and apparatus which is easy and economical to manufacture and can be used in combination with most if not all trailer and vehicle electrical systems without any modification of those systems.

The present invention accomplishes this and other objectives by providing a trailer light monitoring apparatus for monitoring the function of safety signal lights on a trailer during use of the trailer with a vehicle. The system has one or more monitoring circuits which can instantaneously detect variations beyond predefined parameters in one or more safety signal light circuits of a trailer during combined operation of the trailer with a vehicle. The system also has connectors to connect each of the monitoring circuits to one of the safety signal light circuits of the trailer and the vehicle electrical system. Each of the monitoring circuits also have a separate indicator attached to them. The indicators are positioned for observation by the vehicle operator during combined vehicle and trailer operation. The system functions such that when the monitoring circuit detects a malfunction of the safety light signal circuit which it monitors, the monitoring circuit signals the operator through the indicator to which it is attached.

In a specific aspect the system of the present invention has three separate safety signal light circuits one for parking and running lights, one for a left turn/brake signal light and one for a right turn/brake signal light. Each of the safety signal light circuits have one monitoring circuit to monitor it. Each of the monitoring circuits has an indicator, a light emitting diode, attached to it which the monitoring circuit uses to signal variations beyond the predefined parameters.

In a preferred embodiment actual monitoring only occurs when the vehicle operator activates the safety signal light circuits. Thus, if upon activation a safety signal light circuit is functioning properly the indicator sends a positive signal to the vehicle operator. On the other hand, if the monitoring circuit detects that the safety signal light circuit has malfunctioned it sends a negative signal to the vehicle operator. In its simplest form the indicator is an LED which turns on upon activation of the safety signal light circuit, if the safety signal light circuit is functioning properly. If the safety signal light circuit is not functioning properly, the LED does not turn on upon activation of the safety signal light circuit. The safety signal light circuits generally include turn signal circuits, a parking and running light circuit and a brake light circuit which usually consists of the left and right turn signal circuits operating together. In the case of the turn signal lights when functioning properly, the LED blinks in unison with the turn signal lights at the rear of the trailer. If the brake light circuit is functioning properly the LED's turn on every time the brake pedal is depressed and remain on for so long as the brake pedal is depressed indicating the brake lights on the rear of the trailer are turning on each time the brake pedal is depressed. Likewise when the parking and running lights are turned on and they are functioning properly the LED goes on and stays on for so long as the parking and running lights are functioning properly. On the other hand, if on activation of any of the safety signal light circuits they are not functioning properly, the monitoring circuit will so indicate by not turning on the appropriate LED at the time it should turn on.

In another aspect of the present invention the monitoring circuit checks the current in the safety signal light circuit to determine if it has varied beyond predefined parameters.

In yet another aspect of the present invention a meter can function as the indicator.

The invention also provides a method for monitoring the safety signal light circuits of a trailer during operation of the trailer with a vehicle. The steps of the method include monitoring the electrical activity levels of one or more safety signal light circuits of a trailer during operation of the trailer with a towing vehicle; determining if during activation of the one or more safety signal light circuits whether or not the electrical activity levels meet predefined parameters; and indicating if the electrical activity levels meet the predefined parameters.

In a further aspect of this invention the method of monitoring of electrical activity involves monitoring the current levels of the safety signal light circuits.

BRIEF DESCRIPTION OF THE DRAWINGS

The invention will be better understood by an examination of the following description, together with the accompanying drawings, in which:

FIG. 1: provides an overall view of the apparatus of the present invention installed in a vehicle trailer combination;

FIG. 2: provides a view of how the present invention hooks into the electrical hook-up of a trailer vehicle combination;

FIG. 2A: provides an end view of the connectors of a typical plug used to connect a trailers electrical system to that of a vehicle;

FIG. 3: depicts the dashboard of an vehicle with the control and visual display unit of the present invention positioned thereon;

FIG. 3A depicts another version of the visual display unit in which the indicators are meters;

FIG. 4: is a block diagram of the major components of the present invention and their interconnection to the trailer safety signal light circuits and vehicle electrical system;

FIG. 5: is a detailed circuitry diagram of one implementation of the system of the present invention;

FIG. 6: is a detailed circuitry diagram of another implementation of the system of the present invention.

DETAILED DESCRIPTION OF THE PREFERRED EMBODIMENT

Figure 7:
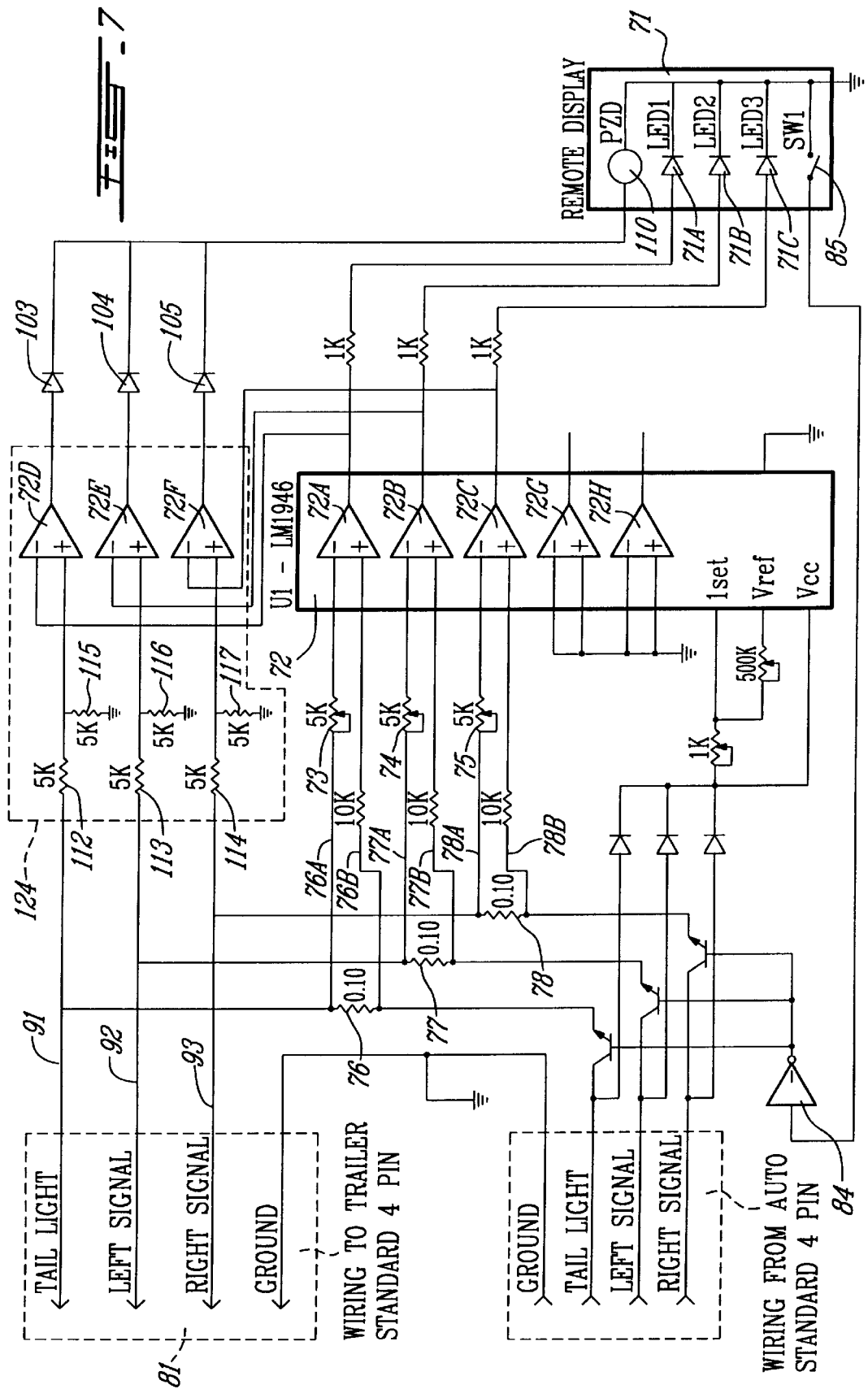
FIG. 7: is a detailed circuitry diagram of a third implementation of the system of the present invention which has the added feature of an audio alarm.

As noted above the apparatus and system of the present invention provide a monitoring circuit or circuits which can warn the operator of a vehicle towing a trailer if the safety signal light circuits of trailer, such as: the running light circuit, turn signal circuits or brake light circuits have failed. Such failure can be total inoperability of the circuit or the blowing of one or more bulbs in the circuit etc. For example after connection of the apparatus and system of the present invention into the combined vehicle trailer electrical system the vehicle operator has on the dash 19 of FIG. 3 of the vehicle 20 of FIG. 1 a control and visual display unit 21. In its simplest form unit 21 has three LED's 24, 25 and 26 as well as a switch 22. The system allows the vehicle operator to then test the safety signal light circuits of the trailer.

The system is designed, as will be described in detail below, to operate as follows: when the operator activates the left turn signal system of the vehicle the operator will see the left turn signal LED 24 blink in tandem with the left turn signal light of the vehicle indicating the left turn signal circuit of the trailer is functioning properly. Likewise when the vehicle operator activates the right turn signal of the vehicle, if the right turn signal circuit of the trailer is functioning correctly, the operator will see LED 26 blinking in tandem with the turn signal indicator of the vehicle. Similarly, when the operator turns on the vehicles running and parking light circuit, LED 25 will turn on and remain on until the lights of the vehicle are turned off or the parking and running light circuits of the trailer fail for whatever reason, such as a blown bulb or a break in the circuit etc. Finally, when the operator depresses the brake pedal of the vehicle activating the vehicle's brake lights, then LED's 24 and 26 will light up in unison indicating that the brake light circuit of the trailer is operating correctly. Thus, as can be appreciated the system allows the vehicle operator to test the proper functioning of the trailer safety light circuits after connecting the trailer and vehicle but prior to using them together and to monitor them each time they are used during a trip.

The preceding only provides a brief description of the overall function of the present invention in a preferred embodiment. After reviewing the following detailed description it will be come apparent that other arrangements exist which do not depart from the concept of the present invention.

FIG. 1 provides an overall view of the present invention installed in an automobile 20 trailer 18 combination. The visual display control unit 21 is positioned in the interior of the vehicle in a position where the driver can easily see it. FIG. 3 shows one such placement with the control and visual display unit 21 positioned on the dashboard 19 of the vehicle. Referring back to FIGS. 1 and 2 cable 36 connects the visual display unit 21 to coupler 33. Coupler 33 in turn joins plug 31 to plug 32. Plugs 31 and 32 are the standard four flat plugs well known in the industry and commonly used for the purpose of joining the electrical system of a trailer and a vehicle while the vehicle tows the trailer. Typically plug 32 is the male plug and 31 is the female plug. Coupler 33 is then constructed to easily interconnect to plugs 31 and 32. Coupler 33 by interconnecting into the existing system of the trailer vehicle combination also conveniently integrates the monitoring circuitry of the present invention with the trailer safety signal light circuitry and the vehicle electrical system so that together the three operate as a unit.

FIG. 2A provides an end view of male plug 32. In this type of set up prong 30 provides the connection for ground, prong 28 connects the circuit for the left turn signal, prong 27 connects the circuit for the right turn signal and prong 29 connects the brake light circuit. Plug 31 connects to the vehicle electrical system in the standard fashion through cable 38 and plug 32 connects to the trailer electrical system in the standard fashion through cable 37. The connection of plugs 31 and 32 into the vehicle and trailer have not been included since it is well known in the art how they connect into the respective electrical systems. Also, although the present description only uses as an example an installation with a standard four flat connector those skilled in the art will readily know after reading the description the present invention can be used with any other type of plug configuration available and used to interconnect the electrical system of a trailer and a vehicle.

FIG. 4 provides a block diagram of the overall functional elements of the system and how they interconnect to the trailer safety light circuitry and the vehicle electrical system. The remote or visual display 21 consists of light emitting diodes (LED's) 24, 25 and 26, as noted above in the preferred embodiment, positioned on the dash of the vehicle for the vehicle operator to see during operation of the vehicle. The visual display 21 connects to the monitoring and warning circuit 51, which will be described in detail below. The monitoring and warning circuit 51 which forms part of the monitoring apparatus of the present invention can be located in the control visual display unit 21 or in coupler 33. Switching unit 52 used in one version of the preferred embodiment is used to shut down the trailer light safety circuits. Connector 33 joins the trailer safety light circuits 54 to the vehicle electrical system 55 as well as switch unit 52 and the monitoring and warning circuit 51. The indicator can be a meter instead of an LED as depicted in FIG. 3A. In FIG. 3A the LED indicators 24, 25 and 26 are replaced by meters 24A, 25A and 26A. The meters operating as indicators would operate in the standard fashion.

Thus, as depicted in FIG. 4, monitoring and warning circuitry 51, remote display 21, switch 52 and connector 33 form the monitoring system or apparatus of the present invention. The overall system works as follows, monitoring and warning circuit 51 monitors certain key parameters of the operation of the trailer safety light circuitry 54 for possible failure in the trailer safety signal light circuitry. The systems primary function as stated above is to warn the driver of a vehicle if any of the safety lights on the trailer under tow by that vehicle have failed. Such a situation can occur if the turn signal lights or brake lights burn out or a break in the line occurs. Upon an indication of a failure the monitoring and warning circuit signals a failure by means of the appropriate indicator on the visual display 21. In the preferred embodiment as indicated above, failure of a circuit or a signal light in that circuit is indicated by the appropriate LED on the visual display 21 or 21 not lighting on activation of the circuit which has the fault in it. Generally two types of failure can occur either an open circuit due to a blown bulb, break in the circuit etc., or a short circuit. However, given the typical circuitry found in trailers and vehicles a short circuit will quickly turn into an open circuit once the short circuit causes the standard fuse in the circuit to burn out or the circuit breaker in the circuit to open. Thus, the system of the present invention does not have to monitor for a short circuit since the short circuit if it persists will quickly turn into an open circuit as a result of a fuse blowing or a circuit breaker opening.

The system of the present invention monitors the current and looks for a decrease in the current level as the key parameter for determining if there has been a failure in the safety light signal circuit. In its simplest form detection of an open circuit would indicate a failure. However, the typical safety light signal circuit such as a running light circuit or tail signal circuit on a trailer may have several lights and the failure of one would only cause a decrease in the current and not result in an open circuit. Thus, the preferred embodiment of the present invention monitors current levels and will react to specific drops in current levels as its key parameter or indicator. On the other hand the turn signal circuits may only have one bulb and if it blows an open circuit results. The system can be configured for each situation and in one embodiment described below addition of the appropriate device, a variable resistor, the vehicle driver can adjust the monitoring circuit to operate with the circuitry in each trailer and vehicle with which it is used.

FIGS. 5 and 6 provide two slightly different versions of circuits which would function as the monitoring and warning circuits of the present invention. The only difference between the circuits being that in FIG. 5 the mechanism 79 used to turn the trailer safety signal light circuits off is a standard type of relay controlled by switch 85, where as the mechanism 83 in FIG. 6 used to turn the circuit off is made up of transistors 83A, 83B and 83C which are controlled by a driver 84 which is in turn controlled by switch 85. Driver 84 functions as an amplifier and a transistor or similar device could be used. During immersion of a boat trailer in water to launch a boat or to retrieve it, being able to turn off all of the safety light signal circuits on a boat trailer eliminates the possibility of the safety light signal circuitry from shorting out and greatly reduces the possibility of the bursting of one or more bulbs in the safety light signal circuits.

Comparators 72A, 72B and 72C form that part of the circuit in the preferred embodiment which senses the current drop and signals the failure of the particular safety lighting circuit which that comparator monitors. For example as seen in FIG. 6, comparator 72B in monitoring or comparator circuit 122 would sense a change in the current, specifically an open circuit or a current drop caused by a blown bulb in the circuit, as a result a drop of the load current or sense voltage which comparator detects across resistor 77. Resistor 77 is in the circuit of the left signal light circuit 92. Thus if one or more of the bulbs in this circuit blow or it becomes an open circuit with no current or in the event all bulbs in the circuit are blown, a corresponding drop in the load current or a complete loss of the load current occurs. Thus when the vehicle operator activates the left turn signal or depresses the brake pedal comparator 72B senses the change on its input lines 77A and 77B and its output does not go high as it normally would and consequently LED 71B to which comparator 73B attaches on line 102 does not light. Thus, the operator is instantaneously appraised of the fact a circuit failure has occurred which requires attention.

Likewise comparators 72A and 72C operate, in their own respective comparator or monitoring circuits 121 and 123, in the same fashion as comparator 72B and its circuit 122 by detecting changes, i.e., decreases in the load current as sensed by voltage on resistors 76 and 78 respectively. Resistor 76 being in the tail light and running light circuit and resistor 78 being in the right turn signal circuit. Thus when a bulb blows on the right turn signal circuit 93 comparator 72C senses the change caused by this event over it two inputs 78A and 78B. Comparator 72C then will not turn on LED 71C when the vehicle operator activates the right turn signal or the brake lights; thus, indicating a failure in the right turn signal circuit. In turn if a failure occurs in the running or tail light circuit 91 comparator 72A will not turn on LED 71A on activation of the running or tail lights and thus signal a failure in circuit 91.

Standard practice in the industry generally configures the brake light circuit of a trailer in one of two ways. The most common arrangement uses both the left turn signal circuit 92 and the right turn signal circuit 93 together as the brake light circuit. A less common method provides a wholly separate circuit for the brake lights. The design of the preferred embodiment of the present invention is designed for use with the more common method of using both the left and right turn signal circuits together as the brake light circuit. However, those skilled in the art will readily appreciate that the present invention can be easily designed to work with a trailer safety light system which has a separate brake light circuit.

In the preferred embodiment, when the vehicle operator depresses the brake pedal both the left turn signal light 41A of FIG. 1 and right turn signal light 42A turn on and remain on for so long as the brake pedal is depressed. Additionally, if the brake light circuit is functioning properly the monitoring circuit 122 of the left turn signal circuit 92 and the monitoring circuit 123 of the right turn signal circuit 93 turn on LED's 71B and 71C. LED's 71B and 71C then remain on for so long as the brake pedal is depressed. If one of the turn signals is turned on when the brake pedal is depressed, the turn signal light activated to signal a turn will blink and likewise the respective LED will blink in unison. However, as can be easily appreciated, the driver will have no problem in determining if the system has malfunctioned since the LED would not light under any circumstances if the particular turn signal bulb had burned out or some other malfunction has occurred in the circuit.

Many different types of schemes exist for placing lights on a trailer. Quite often the turn signal circuits only have one light in each of the turn signal circuits. The parking and running light circuits usually have two or more lights located at different positions on the trailer. FIG. 1 depicts one of the simplest arrangements in use in which the left turn signal circuit has one light 41A and the right turn signal circuit has one light 42A. The parking and running light circuit has two lights 41B and 42B. In FIG. 1 the left turn signal light 41A is combined, in a standard fashion, in one enclosure 41 with the parking and running light 41B and likewise the right turn signal light 42A is combined in one enclosure 42 with the parking and running light 42B.

An additional optional feature of each comparator or monitoring circuit 121, 122 and 123 are rheostats or variable resistors 73, 74 and 75 on each of the comparator circuits. The rheostats allow the vehicle operator to tune the comparator circuits 121, 122 and 123 to the current characteristics of each trailer vehicle combination. The driver would adjust the rheostats to the point where the LED in each circuit turns on when that individual circuit is activated. At that threshold point just enough current flows through the respective safety circuit to activate the comparator to turn on the appropriate LED and any drop caused by a failure such as a blown bulb would result in enough of a drop in current so the respective comparator would not turn on the LED and thus warn the driver of the failure. The preceding only describes the preferred embodiment of the invention and those skilled in the art will readily appreciate that the comparator circuits can be set up in any number of different ways and still achieve the same result, a signal to the vehicle operator that a failure has occurred which creates a safety hazard and requires immediate attention. However, generally only the parking and running light circuits have more than one bulb. Consequently, on most applications only the parking and running light circuits would require a rheostat. The turn signal circuits generally only have one bulb and therefore a failure would result in an open circuit.

In the simple arrangement depicted in FIG. 1 only the parking and running light monitoring circuit 121 of FIGS. 5, 6 and 7 needs a variable resistor 73 since only the tail light or parking and running light circuit 91 have more than one bulb. Thus, as noted above, the sensitivity of monitoring circuit 121 can be adjusted to respond to one burned out bulb. Dial 39 of FIGS. 2 and 3 provides the driver of the vehicle with the means to adjust variable resistor 73 and thus control the sensitivity of monitoring circuit 121. The driver does this by turning on the parking and running lights and adjusting dial 39 until dial 39 reaches the point where the LED for the parking and running light circuit just turns on.

At this point if just one of the bulbs in the parking and running light circuit should burn out, when the driver activates the parking and running light circuit the LED will not turn on and thus warn the driver of the problem. As previously noted, if the turn signal circuits only have one bulb, a device to adjust their sensitivity is generally not needed since the left and right turn signal circuits 92 and 93 would immediately have an open circuit if one of the bulbs burn out. In the event of an open circuit in the left turn signal circuit the monitoring circuit 122 for the left turn signal would not turn on LED 71B. Likewise the monitoring circuit 123 of the right turn signal circuit would not turn on LED 71C.

The preferred embodiment of the present invention uses a National Semiconductor LM1946 Over/Under Limit Diagnostic Circuit 72 in FIGS. 5 and 6. The LM1946 comes with five comparators 72A, 72B, 72C, 72G and 72H; thus, in the preferred embodiment only 72A, 72B and 72C are needed. 72G and 72H are not needed and thus grounded. However, those skilled in the art will readily appreciate that the appropriate comparator circuitry can be configured with a variety of readily available devices, other than the National Semiconductor LM1946, which devices can accomplish the tasks outlined above and that the invention is not limited by the examples depicted in FIGS. 5, 6 and 7. Also, discrete comparators could also be used configured in a number of different ways. Additionally, an appropriately configured operational amplifier could replace the comparators and the same results achieved.

FIG. 7 provides another feature, an audio signal to backup the LEDs of the visual display. FIG. 7 is essentially the same circuit depicted in FIG. 6 except three additional comparators have been added to the circuit 72D, 72E and 72F, creating their own separate mini-circuit 124. These in turn connect to a standard buzzer 110. In the preferred embodiment the buzzer 110 is isolated by diodes 103, 104 and 105. The negative inputs of comparators 72D, 72E and 72F as depicted in FIG. 7 attach respectively to the outputs of comparators 72A, 72B and 72C. The positive inputs of comparators 72D, 72E and 72F as depicted in FIG. 7 connect respectively to the tail light circuit, the left turn signal circuit and the right turn signal circuit. The comparators 72D, 72E and 72F work in a straight forward manner, for example if the operator of the vehicle activates the right turn signal if it operates correctly then comparator 72C activates LED 71C. Accordingly, comparator 72I senses activation of the right turn signal circuit 93 at its positive input and at the same time senses activation of LED 71C by comparator 72C. Therefore comparator 72F does not activate the buzzer 110. However, if there were a malfunction in the right turn signal circuit 93, i.e. a bulb blew, and comparator 72C in response does not activate LED 71C comparator 72F would sense comparator 72C's failure to activate LED 71C it would then activate buzzer 110 thus sending an audio signal alerting the vehicle operator of the failure. Comparators 72D and 72E would operate in a like manner for the tail light circuit 91 and left turn signals 92 respectively. In the preferred embodiment the buzzer would be located in the control visual display unit 21.

Comparators 72D, 72E and 72F then provide 12 volt output if the current in their respective trailer safety circuits is below the required threshold. Output from any one of the LEDs' comparators 72A, 72B 72C circuits is sufficient to cause the comparator 72D, 72E or 72F to actuate the buzzer 110. Buzzer 110 is a standard ceramic buzzer; however, any number of different types of buzzers currently available can be used. Additionally, in the preferred embodiment a number of additional circuit elements have been included in circuit 124 which include resistors 112, 113, 114, 115, 116 and 117. Each of the positive inputs of comparators 72D, 72E and 72F also go to ground through resistors 115, 116 and 117 respectively.

Those skilled in the art will readily appreciate the minor circuit elements in FIGS. 5, 6 and 7 are typical and thus a description of each circuit element in FIGS. 5, 6 and 7 has not been provided since those skilled in the art upon reading the description herein and studying the drawings will have no problem in understanding the invention and how it functions. Also, those skilled in the art will understand that most vehicle electrical systems operate on 12 volts and that the circuit elements have to be compatible with these systems.

The preferred embodiment of the present invention depicted and described herein is configured for use in existing vehicles and trailers without any additional modifications other than installation of the standard connectors to the trailer and vehicle. However, it can be easily seen that the present invention can be adapted to new vehicle construction. It could be included as a trailer pulling package. The circuitry can be incorporated into that of the vehicle and the warning display or lights can be built into the dashboard of the vehicle or some other appropriate location. One such location could be on the front of the center rear brake light located inside the rear window of the vehicle. Thus when the driver looks in the rear view mirror he could check the warning lights or diodes.

By building the entire system into a new vehicle with the trailer hook up connector included it would avoid the need for the disturbing of the vehicle electrical system and to add the standard trailer electrical hookup. All that the vehicle owner would have to do is purchase a trailer with the correct connector to link the vehicle electrical system to the trailer signal safety light system.

While the invention has been particularly shown and described with reference to a preferred embodiment thereof, it will be understood by those skilled in the art that various changes in form and detail may be made to it without departing from the spirit and scope of the invention.

What is claimed is:

1. A trailer light monitoring apparatus for monitoring the function of safety signal lights on a trailer during use of the trailer with a vehicle, said safety signal lights and the electrical system of said vehicle being directly connected by a two-part connector during normal use, said apparatus comprising:

a monitoring apparatus with at least one monitoring circuit which can instantaneously detect variations beyond predefined parameters in at least one light circuit of a trailer during combined operation of the trailer with a vehicle;

said monitoring apparatus having a one-piece connector insertable between the two parts of said two-part connector to connect said at least one monitoring circuit to the at least one safety signal light circuit of the trailer and the vehicle electrical system;

said monitoring apparatus connecting into both the at least one safety signal light circuit of the trailer and the vehicle electrical system to form a connection therebetween, and wherein the signal light circuit and the vehicle electrical system can operate directly connected to each other or with said monitoring apparatus connected therebetween; and said monitoring apparatus has at least one indicator operatively connected to the at least one monitoring circuit and positioned for observation by the vehicle operator during combined vehicle and trailer operation, whereby said at least one indicator, upon receipt of a signal from said at least one monitoring circuit that the at least one electrical signal light circuit of the trailer has varied beyond certain predefined parameters, warns the operator of the vehicle.

2. The apparatus of claim 1 further comprising a switch which allows the vehicle operator to shut off the at least one safety signal light circuit of the trailer.

3. The apparatus of claim 2 wherein the switch is accessible to the vehicle operator during operation of the vehicle so that the operator can shut off the at least one safety signal light circuit of the trailer when maneuvering the trailer where it may become immersed in water to avoid short circuiting the at least one safety signal light circuit of the trailer.

4. The apparatus of claim 1 wherein the at least one safety signal light circuit of the trailer comprises three separate circuits one for parking and running lights, one for a left turn signal light and one for a right turn signal light and wherein the at least one monitoring circuit comprises a separate monitoring circuit for the parking and running light circuit, the left turn signal circuit and the right turn signal and wherein the at least one indicator comprises a separate indicator for each of the monitoring circuits and wherein each indicator signals the vehicle operator when it receives a signal from the monitoring circuit to which it is attached has detected that the safety signal circuit to which that monitoring circuit is attached varies beyond the predefined parameters.

5. The apparatus of claim 4 wherein the left turn signal circuit and right turn signal circuit operate together as a brake light circuit on the trailer and the monitoring circuit for the left turn signal and its indicator, and the monitoring circuit for the right turn signal and its indicator operate together as a monitoring circuit of the brake light circuit on the trailer.

6. The apparatus of claim 4 wherein the indicators are light emitting diodes.

7. The apparatus of claim 4 wherein the indicators are lights.

8. The apparatus of claim 4 wherein each of the monitoring circuits monitors the current level in the respective safety signal light circuit it monitors and the predefined parameters are variations beyond certain current levels.

9. The apparatus of claim 8 wherein the parking and running light safety circuits each comprise at least two bulbs and the parking and running light monitoring circuit can detect when at least one of these bulbs has malfunctioned and indicate that the malfunctioning bulb has resulted in the circuit varying beyond the predefined parameters and so indicate to the vehicle operator through the indicator of the monitoring circuit of the parking and running light circuit.

10. The apparatus of claim 4 further comprising a brake signal light circuit which circuit has a monitoring circuit with an indicator.

11. The apparatus of claim 1 wherein the at least one monitoring circuit monitors the current level in the at least one safety signal light circuit and the predefined parameters are variations beyond certain current levels.

12. The apparatus of claim 11 wherein the monitoring circuit uses at least one comparator to detect changes in the current.

13. The apparatus of claim 1 wherein the predefined parameter is an open circuit.

14. The apparatus of claim 1 wherein the at least one monitoring circuit comprises further means to change the predefined parameters to which the at least one monitoring circuit responds.

15. The apparatus of claim 14 wherein the means to adjust comprises a variable resistor.

16. The apparatus of claim 1 wherein the indicator produces an audio signal to warn the operator of the vehicle.

17. The apparatus of claim 1 wherein monitoring circuit only monitors the at least one safety signal circuit during activation of the at least one safety signal light circuit.

18. The apparatus of claim 1 wherein the indicator is a meter.

19. The apparatus of claim 1 wherein said safety signal light circuit is a safety signal light circuit selected from the group consisting of a turn signal circuit a brake light circuit and a running light circuit.

20. A method for monitoring the safety signal light circuits of a trailer during operation of the trailer with a vehicle, said safety signal lights and the electrical system of said vehicle being directly connected by a two-part connector during normal use, said method comprising:

monitoring, with a monitoring apparatus which connects to an electrical system of a towing vehicle and the safety signal light circuits of a trailer said monitoring circuit forming a connection therebetween by a one-piece connector insertable between the two parts of said two-part connector, the electrical activity levels of at least one safety signal light circuit of the trailer during operation of the trailer with the vehicle, and wherein the signal light circuit and the vehicle electrical system can operate directly connected to each other or with said monitoring apparatus connected therebetween;

determining if during activation of the at least one safety signal light circuit whether or not the electrical activity levels meet predefined parameters; and indicating if the electrical activity levels meet the predefined parameters during activation of the at least one safety signal light circuit.

21. The method of claim 20 wherein the step of monitoring the electrical activity comprises monitoring the current levels.

22. The method of claim 20 wherein the step of indicating comprises providing a warning signal to the vehicle operator.

23. The method of claim 22 wherein the step of providing a warning signal comprises providing a visual signal.

24. The method of claim 22 wherein the step of providing a warning signal comprises providing an audio signal.

25. The method of claim 20 wherein the step of monitoring the at least one safety signal light circuit comprises monitoring three circuits: a parking running light circuit, a left turn signal circuit and a right turn signal circuit; and the steps of monitoring determining and indicating are done separately for each of these circuits.

26. The method of claim 25 wherein:

the step of monitoring the electrical activity comprises monitoring the current levels; and indicating comprises providing a warning signal to the vehicle operator.

27. The method of claim 25 comprising the further step of monitoring a brake light circuit.

\* \* \* \* \*